(12) United States Patent
Kong et al.

(10) Patent No.: US 9,508,105 B2
(45) Date of Patent: Nov. 29, 2016

(54) METHOD AND SYSTEM FOR PROVISIONING ENERGY PROFILE IN HOME AREA NETWORK

(75) Inventors: Dong-Keon Kong, Suwon-si (KR); Joon-Ho Park, Seongnam-si (KR); Yong Chang, Seongnam-si (KR); Hyoung-Kyu Lim, Seoul (KR); Se-Hee Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 633 days.

(21) Appl. No.: 13/253,668

(22) Filed: Oct. 5, 2011

(65) Prior Publication Data
US 2012/0083937 A1 Apr. 5, 2012

(30) Foreign Application Priority Data
Oct. 5, 2010 (KR) .......................... 10-2010-0096820

(51) Int. Cl.
| | |
|---|---|
| G06F 1/26 | (2006.01) |
| G06Q 50/06 | (2012.01) |
| G05B 15/02 | (2006.01) |
| H04L 12/28 | (2006.01) |
| H02J 3/14 | (2006.01) |

(52) U.S. Cl.
CPC .............. *G06Q 50/06* (2013.01); *G05B 15/02* (2013.01); *H04L 12/28* (2013.01); *H04L 12/2829* (2013.01); *H02J 2003/143* (2013.01); *H04L 2012/285* (2013.01)

(58) Field of Classification Search
CPC ...... G06Q 50/06; G05B 15/02; H04L 12/28; H04L 12/2829; H02J 2003/143
USPC ........................................................ 700/295
See application file for complete search history.

(56) References Cited

U.S. PATENT DOCUMENTS

2007/0160022 A1 7/2007 McCoy et al.
2008/0219186 A1* 9/2008 Bell et al. ..................... 370/254
(Continued)

OTHER PUBLICATIONS

International Search Report dated Mar. 28, 2012 in connection with International Patent Application No. PCT/KR2011/007356.
(Continued)

*Primary Examiner* — Robert Fennema
*Assistant Examiner* — Sivalingam Sivanesan

(57) ABSTRACT

A method for configuring a Home Energy Management System (HEMS) in a Home Area Network (HAN) is provided. The method includes registering the HEMS to a smart meter, and managing an energy profile of an HAN device including the smart meter connected to the HAN. Accordingly, a Demand Response (DR) may not normally operate between devices even if energy profile differs from one device to another.

52 Claims, 11 Drawing Sheets

(56) References Cited

U.S. PATENT DOCUMENTS

| | | |
|---|---|---|
| 2008/0219239 A1* | 9/2008 | Bell et al. ............. 370/351 |
| 2008/0224892 A1* | 9/2008 | Bogolea et al. ........ 340/870.3 |
| 2008/0272934 A1* | 11/2008 | Wang et al. ........ 340/870.11 |
| 2010/0082174 A1* | 4/2010 | Weaver ............... 700/295 |
| 2010/0088261 A1 | 4/2010 | Montalvo |
| 2010/0127889 A1 | 5/2010 | Vogel et al. |
| 2010/0156665 A1 | 6/2010 | Krzyzanowski et al. |
| 2010/0179862 A1* | 7/2010 | Chassin et al. ............ 705/10 |
| 2010/0198713 A1* | 8/2010 | Forbes et al. ............. 705/34 |
| 2010/0217549 A1 | 8/2010 | Galvin et al. |
| 2011/0015802 A1* | 1/2011 | Imes ................. 700/300 |
| 2011/0046792 A1* | 2/2011 | Imes et al. ............. 700/278 |
| 2011/0202293 A1* | 8/2011 | Kobraei et al. ............ 702/62 |
| 2011/0208366 A1* | 8/2011 | Taft .................. 700/295 |
| 2012/0105249 A1* | 5/2012 | Bauerfeld et al. ....... 340/870.02 |

OTHER PUBLICATIONS

Written Opnion of the International Searching Authority dated Mar. 28, 2012 in connection with International Patent Application No. PCT/KR2011/007356.

Extended European Search Report dated Apr. 7, 2016 in connection wtih European Application No. 11830895.6, 5 pages.

* cited by examiner

METHOD AND SYSTEM FOR PROVISIONING ENERGY PROFILE IN HOME AREA NETWORK

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Oct. 5, 2010 and assigned Serial No. 10-2010-0096820, the entire disclosure of which is hereby incorporated by reference.

TECHNICAL FIELD OF THE INVENTION

The present invention relates to a Home Area Network (HAN). More particularly, the present invention relates to a method and system for automatically provisioning an energy profile between devices in the HAN.

BACKGROUND OF THE INVENTION

Information Technologies (IT) (i.e., Internet, high volume hard disks, and super high speed communication) have been continuously developed ever since the late of $20^{th}$ century. Meanwhile, due to similarity between communication using an Internet cable and communication using a power line and also due to high similarity between a communication industry and a power industry, the IT industry and the power industry are being integrated. The integration of IT and power technologies has a synergy effect, and thus a smart grid is introduced as an intelligent power network which is reliable and highly effective.

In the smart grid, a function of a smart meter (i.e., an electronic power meter) that monitors power rate information on a real time basis is important. The smart meter can configure a wide range of customer energy management requirements such as various energy smart home appliances that can perform bidirectional radio communication and that use a thermometer, a real time-based communication information display, and a Zigbee technique. As such, the smart meter monitors a power consumption amount and power rate information on a real time basis with respect to a plurality of smart home appliances located in homes or offices, and provides the monitoring result to a head-end server of a power provider.

Meanwhile, in a demand side (i.e., homes or offices), the smart meter and the smart home appliances can communicate by using an application protocol called an energy profile for a Demand Response (DR). However, since various energy profiles exist for each function or each country, there are devices supporting the various energy profiles. In order to perform the DR between the smart devices, the smart devices need to support the same version of energy profiles.

Accordingly, there is a need for a method and system for automatically provisioning an energy profile between devices in a Home Area Network (HAN).

SUMMARY OF THE INVENTION

To address the above-discussed deficiencies of the prior art, it is a primary object to provide at least the advantages described below. Accordingly, an aspect of the present invention is to provide a method and system for automatically provisioning an energy profile between devices in a Home Area Network (HAN).

Another aspect of the present invention is to provide a method and system for effectively managing an energy profile supported between devices in an HAN.

In accordance with an aspect of the present invention, a method for configuring a Home Energy Management System (HEMS) in an HAN is provided. The method includes registering the HEMS to a smart meter, and managing an energy profile of an HAN device including the smart meter connected to the HAN.

In the aforementioned aspect of the present invention, the managing of the energy profile of the HAN device including the smart meter connected to the HAN may include requesting by the HAN device a beacon message broadcasting to the smart meter, and transmitting by the smart meter the beacon message including energy profile information to the HAN device.

In addition, the managing of the energy profile of the HAN device including the smart meter connected to the HAN may include performing radio access between a User Equipment (UE) and the HEMS, receiving location information by transmitting a location request message by the HEMS to the UE, requesting a profile by the HEMS by transmitting the location information of the UE to a server that manages the HEMS, and receiving, by the HEMS, energy profile information of the smart meter from an HEMS server.

In addition, the managing of the energy profile of the HAN device including the smart meter connected to the HAN may include receiving, by an HEMS management server, location information of a UE from the HEMS, determining, by the HEMS management server, power provider information of a corresponding area and smart meter's energy profile information provided by a power provider, on the basis of the location information of the UE, and transmitting, by the HEMS management server to the HAN device, a profile message including the power provider information of the corresponding area and the smart meter's energy profile information provided by the power provider.

In addition, the managing of the energy profile of the HAN device including the smart meter connected to the HAN may include exchanging an energy profile between the HAN device and the HEMS, upon receiving a profile update request message including an address of a download server from the HEMS, downloading by the HAN device a new energy profile by using a file transfer protocol by establishing a connection to the download server, and installing by the HAN device the downloaded new energy profile.

In addition, the managing of the energy profile of the HAN device including the smart meter connected to the HAN may include exchanging a energy profile between the HEMS and the HAN device, determining by the HEMS whether a energy profile of the HAN device can be supported, by determining an energy profile version of the HAN device, and if the energy profile of the HAN device cannot be supported, transmitting by the HEMS a profile update request message including an address of a download server to the HAN device.

In accordance with another aspect of the present invention, a system for registering to a smart meter in an HAN is provided. The system includes a HEMS that transmits a first register request message to a HEMS management server, the HEMS management server that transmits a second register request message including customer information to a head-end server that manages the smart meter in a utility provider network after confirming customer information of the HEMS, and the head-end server that provisions HEMS information and authorization key information to the smarter meter after performing customer authorization on the basis of the customer information.

In accordance with another aspect of the present invention, a HEMS for provisioning an energy profile between devices in an HAN is provided. The HEMS includes a controller that performs radio access between a UE and the HEMS, receives location information by transmitting a location request message to the UE, for transmitting the location information of the UE to an HEMS server, and receives energy profile information of a smart meter from the HEMS server.

In accordance with another aspect of the present invention, a HEMS management server that provisions an energy profile between devices in an HAN is provided. The HEMS includes a controller that receives location information of a UE from the HEMS, that determines power provider information of a corresponding area and smart meter's energy profile information provided by a power provider, on the basis of the location information of the UE, and that transmits, to an HAN device, a profile message including the power provider information of the corresponding area and the smart meter's energy profile information provided by the power provider.

In accordance with another aspect of the present invention, a HAN device that updates an energy profile between devices in an HAN is provided. The HAN device includes a controller that exchanges an energy profile between the HAN device and an HEMS, upon receiving a profile update request message including an address of a download server from the HEMS, that downloads by the HAN device a new energy profile by using a file transfer protocol by establishing a connection to the download server, and that installs the downloaded new energy profile.

In accordance with another aspect of the present invention, a HEMS that updates an energy profile between devices in an HAN is provided. The HEMS includes a controller that exchanges a energy profile with an HAN device, determines whether a service profile of the HAN device is supported, by confirming an energy profile version of the HAN device, and if the energy profile of the HAN device is not supported, transmits a profile update request message including an address of a download server to the HAN device.

In accordance with another aspect of the present invention, a HEMS that updates an energy profile between devices in an HAN is provided. The HEMS includes a controller that exchanges a service profile with an HAN device, determines whether a energy profile of the HAN device is supported, by determining an energy profile version of the HAN device, if the energy profile of the HAN device is not supported, downloading by the HAN device a new energy profile by using a file transfer protocol by establishing a connection to the download server, and installs the downloaded new energy profile.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communication terminal. Exemplary embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

The present invention described below relates to a method and system for provisioning an energy profile between devices in a Home Area Network (HAN). In particular, in the present invention, a Home Energy Management System (HEMS) pre-recognizes energy profile information of another device and, if necessary, communicates with a home device by interworking with a network server.

Figure 1:
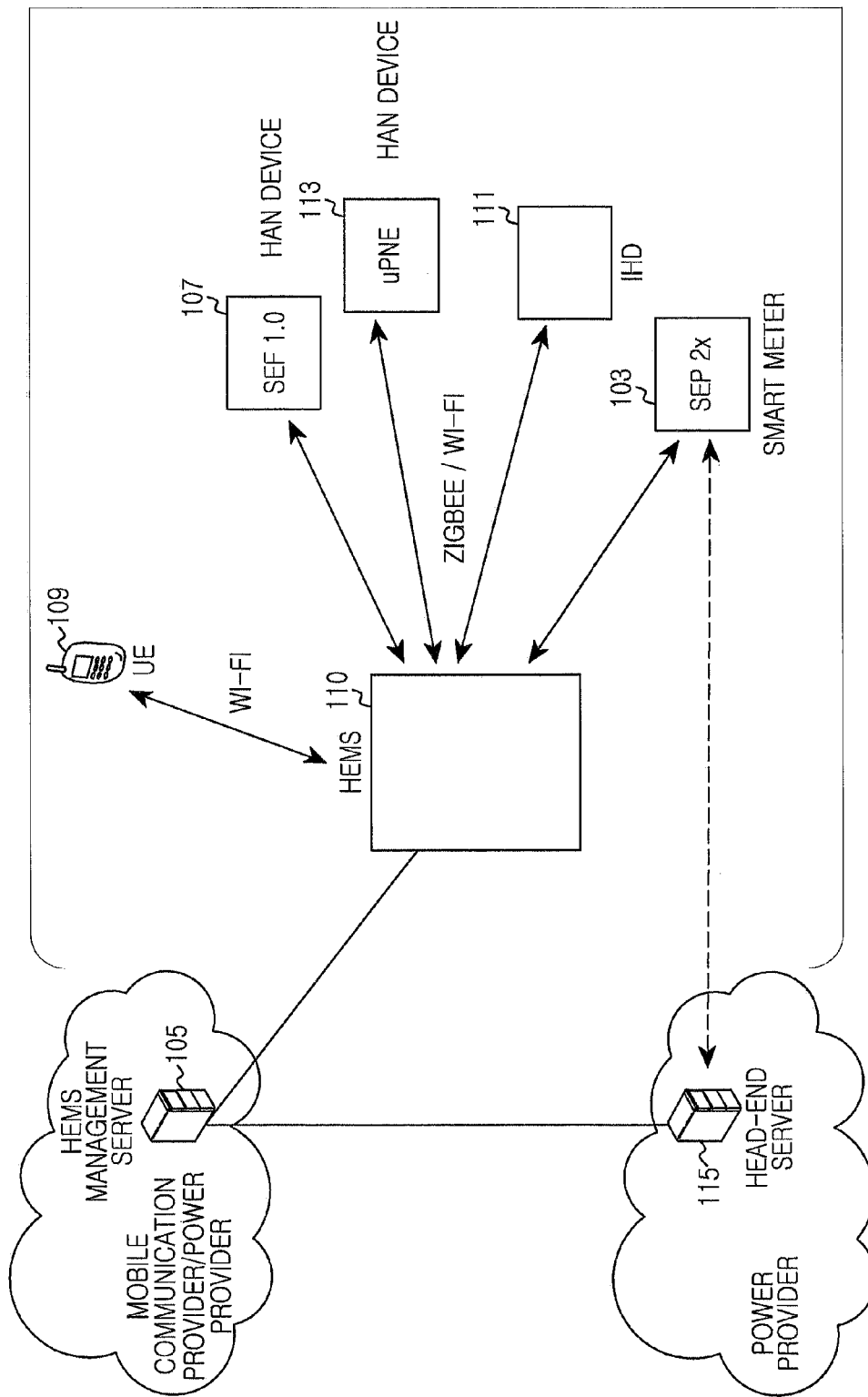
FIG. 1 illustrates a block diagram of a Home Area Network (HAN) system that performs a Demand Response (DR) according to an exemplary embodiment of the present invention.

FIG. 1 illustrates a block diagram of an HAN system that performs a Demand Response (DR) according to an exemplary embodiment of the present invention.

Referring to FIG. 1, devices (e.g., a smart meter 103, smart home appliances 107, 113, and 111, an HEMS 101, and the like) in the HAN may employ a Zigbee or a Wi-Fi module for data transmission and reception.

The HEMS 101 is a home energy management system, and properly controls energy consumption and loads of HAN devices in accordance with power rate information provided from the smart meter 103. The smart meter 103 is an electronic power measurement device that may know a per-hour cost by using a function of measuring a power consumption amount per hour and transmitting the measured information through a network. Although the smart meter 103 has a similar shape with the conventional power meter, the smart meter 103 may check for the power consumption amount on a real time basis and may perform bidirectional communication between users by using a Liquid Crystal Display (LCD). Therefore, through the smart meter 103, a power provider and a user may reduce a cost for examining the power consumption amount and may save energy. The In-Home Display (IHD) 111 is a display installed inside homes, and is a device that displays a variety of power, energy, and extra information. An HEMS management server 105 performs a management function and a provisioning function of the HEMS 101 of a demand side. The HAN devices 107 and 113 collectively refer to a device that requires energy control, such as, a smart home appliance, a Programmable Communicating Thermostat (PCT), or an electric car charger.

A UE 109 is a portable device that may perform wireless communication with a display such as a smart phone, a computer, or the like. A head-end server 115 is a server located in a network of the power provider. The head-end server 115 manages the smart meter 103 and transmits energy cost information to the smart meter 103 or receives an energy consumption amount of the demand side from the smart meter 103.

Meanwhile, in the demand side, an application protocol called an energy profile may be used for the DR to perform communication between the HEMS 101 and the smart meter 103 and between the HEMS 101 and the HAN devices 107, 111, and 113. The energy profile has various types, for example, an Internet Protocol (IP)-based energy profile such as a Zigbee Smart Energy Profile (SEP), a uPNP Smart Grid (SG), DLMS/COSEM, and the like, and a non-IP-based energy profile. It is assumed in the present invention that the HAN device 107 supports an SEP 1.0 energy profile, the HAN device 113 supports a uPNP SG energy profile, and the smart meter 103 supports SEP2.x.

It is assumed in the present invention that the smart meter 103 is pre-installed in the demand side. If a customer purchases the HEMS 101 and installs the HEMS 101 at home, a process of registering the HEMS 101 to the smart meter 103 is necessary. To register the HEMS 101 to the smart meter 103, interworking with the head-end server 115 of a utility provider is necessary.

Figure 2:
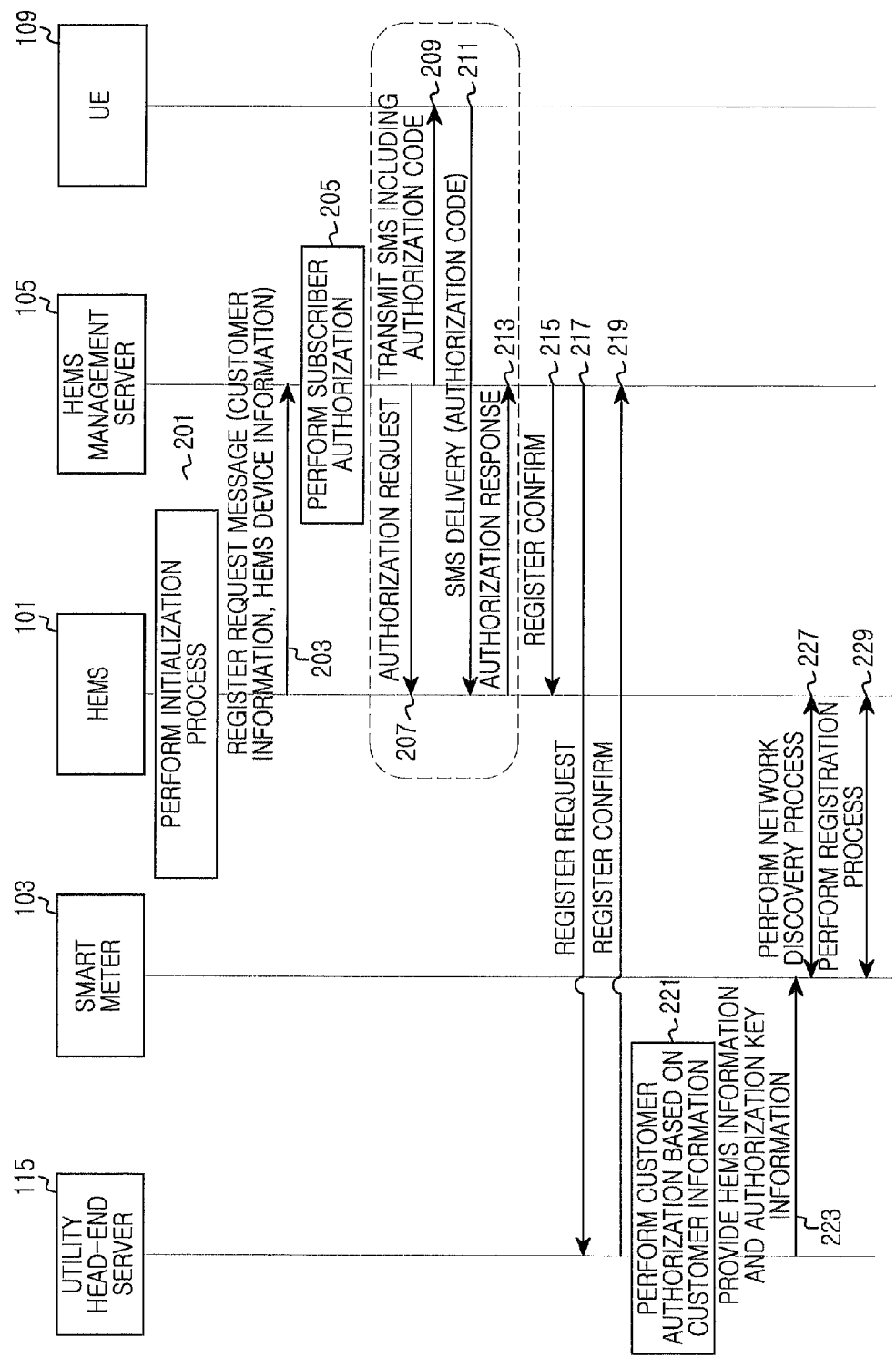
FIG. 2 illustrates a process of registering a Home Energy Management System (HEMS) 101 to a smart meter 103 in an HAN according to an exemplary embodiment of the present invention.

FIG. 2 illustrates a process of registering an HEMS 101 to a smart meter 103 in an HAN according to an exemplary embodiment of the present invention.

Referring to FIG. 2, the HEMS 101 powers on and then performs a default initialization process with respect to an HEMS management server 105 in block 201.

That is, the HEMS 101 transmits a register request message to the HEMS management server 105 in block 203. The register request message includes customer information and HEMS device information (i.e., an installation code, and the like). The customer information is directly received by using an HEMS input window or an additional display device.

The HEMS management server 105 performs subscriber authorization by referring to the transmitted customer information (i.e., an authorization code) in block 205. If there is no customer authorization information in block 203, blocks 207 to 213 are performed. That is, blocks 207 to 213 are optionally performed according to whether there is the customer authorization information or not.

For example, if there is no customer authorization information, in block 207, the HEMS management server 105 requests the customer authorization information by transmitting an authorization request message to the HEMS 101. In block 209, the HEMS management server 105 transmits a Short Message Service (SMS) message including an authorization code to the UE 109 of the customer registered when purchasing the HEMS 101. In this case, it is assumed that an application program for smart energy is pre-installed in the UE, and the HEMS 101 and the UE 109 may perform 3G cellular communication with each other in block 211. Upon receiving the authorization code from the HEMS management server 105, the UE 109 transmits the authorization code to the HEMS 101 by including the code into an SMS delivery message in block 211. In another embodiment, block 211 may be omitted, and the customer may input the received authorization code value by directly using an HEMS input window or another additional display device.

In block 213, the HEMS 101 transmits to the HEMS management server 105 an authorization response message including the authorization code received from the UE 109 or input from the customer.

Through blocks 203 to 213, if customer authorization is successfully performed, the HEMS management server 105 reports successful completion of the registration process by transmitting a register confirm message to the HEMS 101 in block 215.

Further, the HEMS management server 105 transmits a register request message to register the HEMS 101 to the head-end server 115 that manages the smart meter in the network of the utility provider in block 217. In this case, customer information and HEMS information are delivered.

In block 219, the head-end server 115 transmits a register confirm message to the HEMS management server 105.

In block 221, the head-end server 115 performs customer authorization on the basis of the delivered customer information. If the customer authorization is successfully performed, in block 223, the head-end server 115 creates an authorization key to provide the HEMS information and the authorization key information to the smart meter 103.

The smart meter 103 and the HEMS 101 perform a network discovery process in block 227, and perform a registration process in block 229.

Figure 3:
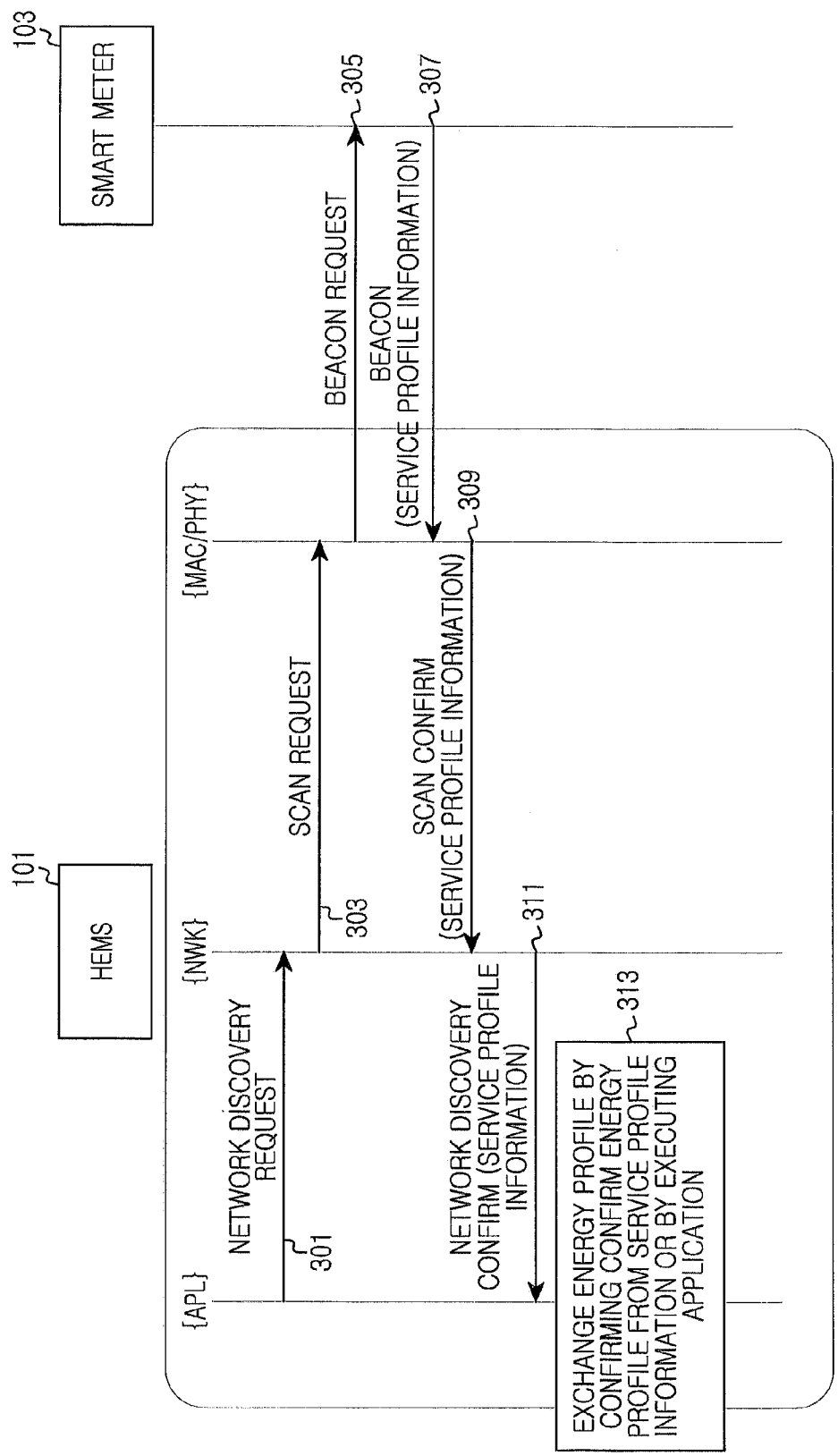
FIG. 3 illustrates a process of exchanging energy profile information between an HEMS 101 and a smart meter 103 in an HAN according to an exemplary embodiment of the present invention.

FIG. 3 illustrates a process of exchanging energy profile information between an HEMS 101 and a smart meter 103 in an HAN according to an exemplary embodiment of the present invention.

The HEMS 101 performs radio access through Wi-Fi or Zigbee, and then performs an energy control function by using an energy profile. In this case, the two devices may have different energy profiles, and if they have the different energy profiles, the energy control function is not performed. Therefore, the present invention describes a method of performing an operation by automatically recognizing an energy profile of a peer device without an additional manual setup process. Meanwhile, among radio communication techniques, Zigbee will be described by example in the present disclosure. When the HEMS 101 initially powers on, a network discovery process is performed. The HEMS 101 is roughly classified in to a network layer, a Media Access Control (MAC) layer, and a PHYsical (PHY) layer, and data is transmitted and received between the layers by using a primitive message.

Referring to FIG. 3, an application layer of the HEMS 101 transmits a network discovery request message to the network layer to instruct to start a network discovery process in block 301. In block 303, upon receiving the network discovery request message, the network layer of the HEMS 101 transmits a scan request message to the MAC/PHY layer to instruct to scan neighboring radio channels. In block 305, the MAC/PHY layer of the HEMS 101 broadcasts a beacon request message.

In block 307, upon receiving the beacon request message, the smart meter 103 transmits a beacon message by including the service profile information delivered from the application layer into a device capacity field of a beacon payload.

In block 309, the MAC/PHY layer of the HEMS 101 receives a scan confirm message and forwards the message to the network layer of the HEMS 101. In block 311, the network layer of the HEMS 101 receives a network discovery confirm message to acquire service profile information of the smart meter 103. The service profile information includes a manufacturer, a utility provider, an energy profile version, a type, and an application IDentifier (ID). In this case, the energy profile version may be transmitted directly by being included in the service profile information, or if it is not transmitted directly, the energy profile version may be transmitted by executing a corresponding application by including the application ID.

Figure 11:
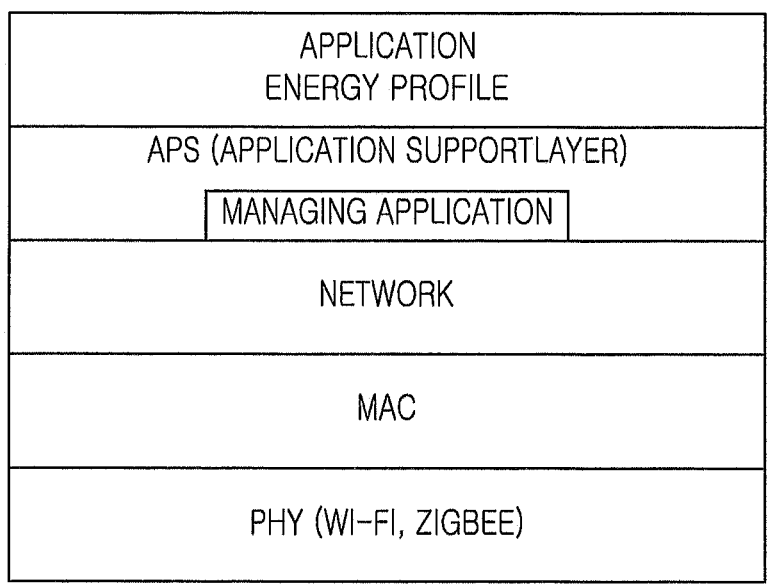
FIG. 11 illustrates a protocol layer diagram according to an exemplary embodiment of the present invention.

If the application ID is included in the service profile information, after establishing a link, proceeding to block 313, the energy profile information or the like is exchanged by executing a managing application corresponding to the application ID according to a protocol layer diagram of FIG. 11.

In another embodiment, an HAN device may take a role of the HEMS 101, or the HEMS 101 may take a role of the smart meter 103.

Therefore, in another embodiment, the HAN device transmits a beacon request message to the HEMS 101, and the HEMS 101 transmits the beacon message to the HAN device by including the application ID into the beacon message. Upon receiving the beacon message, the HAN device executes the managing application by referring to the application ID included in the service profile. The managing application is used to transmit device information and energy profile version information to the HEMS 101.

Figure 4:
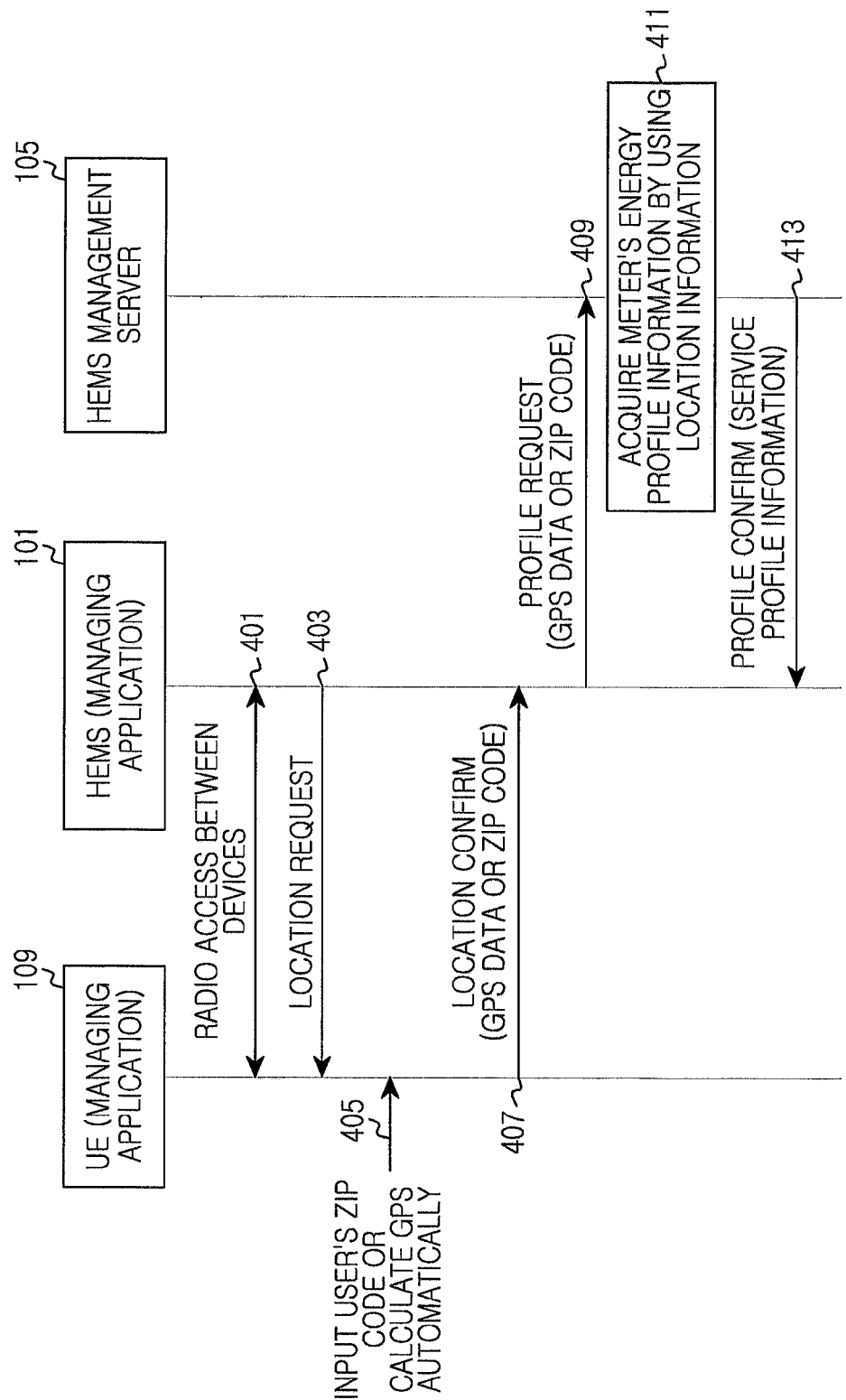
FIG. 4 illustrates a process of pre-recognizing energy profile information of a smart meter when an HEMS 101 interworks with a User Equipment (UE) without communicating with a smart meter 103 in an HAN according to an exemplary embodiment of the present invention.

FIG. 4 illustrates a process of pre-recognizing energy profile information of a smart meter when an HEMS 101 interworks with a UE without communicating with a smart meter 103 in an HAN according to an exemplary embodiment of the present invention. It is assumed that the UE has a Global Positioning System (GPS) module capable of location estimation.

Referring to FIG. 4, the HEMS 101 and the UE 109 can communicate with each other by performing a mutual access process in block 401. Further, a managing application program for the smart energy mentioned in the process of FIG. 3 is driven.

In block 403, the HEMS 101 transmits a location request message to the UE 109. Upon receiving the location information request message, the UE 109 informs this to a user and receives a zip code from the user or calculates GPS data in block 405.

In block 407, the UE 109 transmits a location information confirm message including the GPS data or the zip code to the HEMS 101.

In block 409, the HEMS 101 transmits location information, which is received from the UE, to the HEMS management server 105 by including the location information into a profile request message.

In block 411, the HEMS management server 105 acquires power provider information of a corresponding area and smart meter's energy profile information provided from a provider by using the received location information.

In block 413, the HEMS management server 105 transmits the profile confirm message including the energy profile information to the HEMS 101.

In another embodiment of the present invention, if the HEMS 101 has a display window or a GPS module, blocks 401 to 407 may be omitted.

Figure 5:
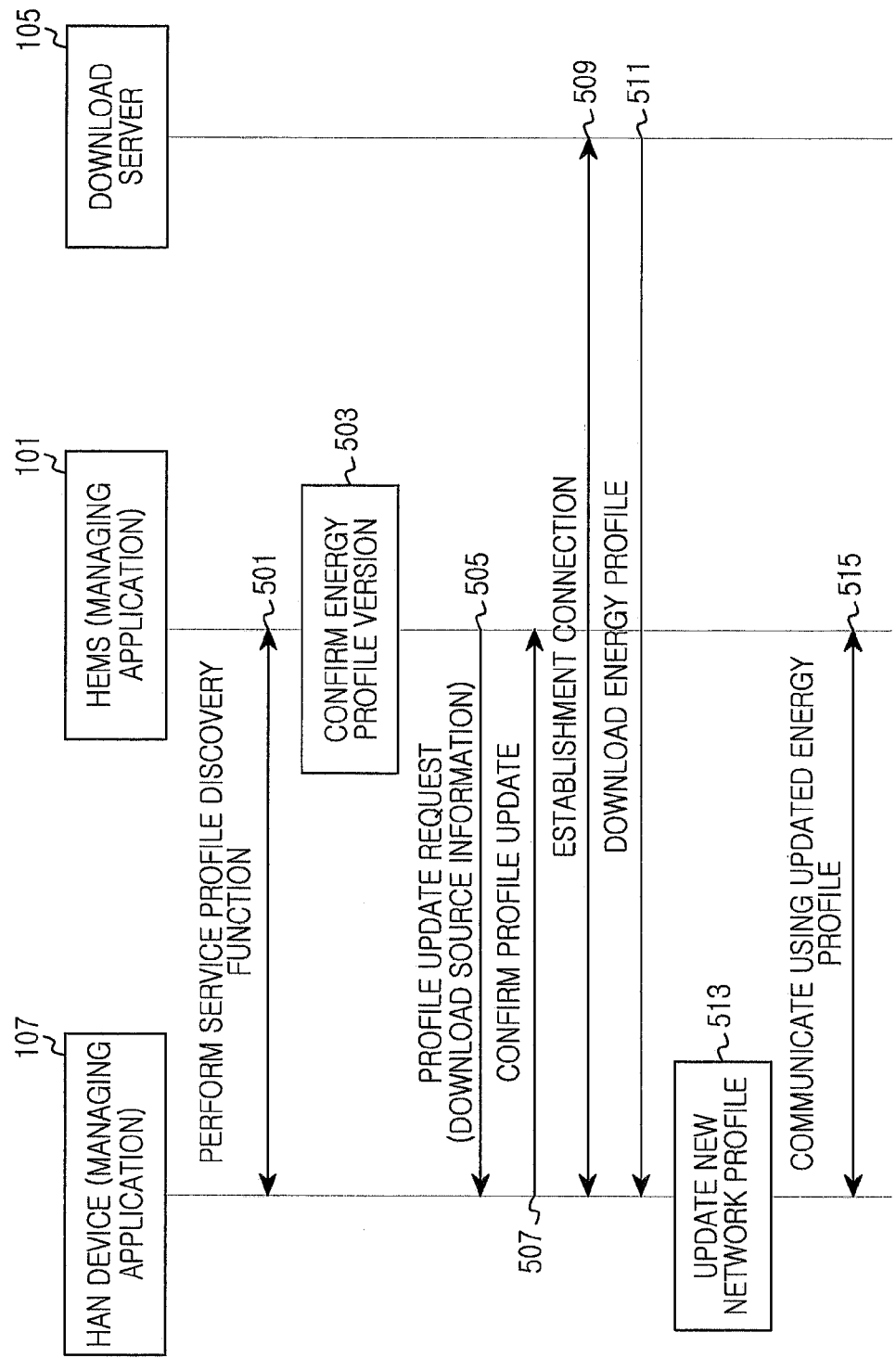
FIG. 5 illustrates a process of updating an energy profile of an HAN device when an HEMS 101 communicates with an HAN device 107 in an HAN according to an exemplary embodiment of the present invention.

FIG. 5 illustrates a process of updating an energy profile of an HAN device when an HEMS 101 communicates with an HAN device 107 in an HAN according to an exemplary embodiment of the present invention. In some embodiments, the HEMS 101 and the HAN device 107 perform the process of FIG. 3, and the aforementioned managing application program for smart energy is driven.

Referring to FIG. 5, the HEMS 101 and the HAN device 107 perform a service profile discovery function in block 501. In block 503, the HEMS 101 acquires energy profile version information and then confirms whether it is an energy profile version that may be supported by the HEMS 101. If the energy profile version is not supported, proceeding to block 505, the HEMS 101 transmits a profile update request message to the HAN device 107. In this case, source information (i.e., server address) capable of downloading the energy profile is included. In block 507, the HAN device 107 transmits an energy profile update response message. If the energy profile version is supported, the HEMS 101 does not perform block 505, and all processes are omitted until block 513.

An energy profile download server may be an HEMS management server 105 or the HEMS 101. It is assumed in this embodiment that the energy profile download server is the HEMS management server 105.

In block 509, the HAN device 107 establishes a connection with the energy profile download server. In block 511, the HAN device 107 downloads the energy profile from the download server by using a File Transfer Protocol (FTP).

In block 513, the HAN device 107 updates the energy profile to the downloaded energy profile.

In block 515, the HAN device 107 and the HEMS 101 communicate with each other by using the updated energy profile.

Figure 6:
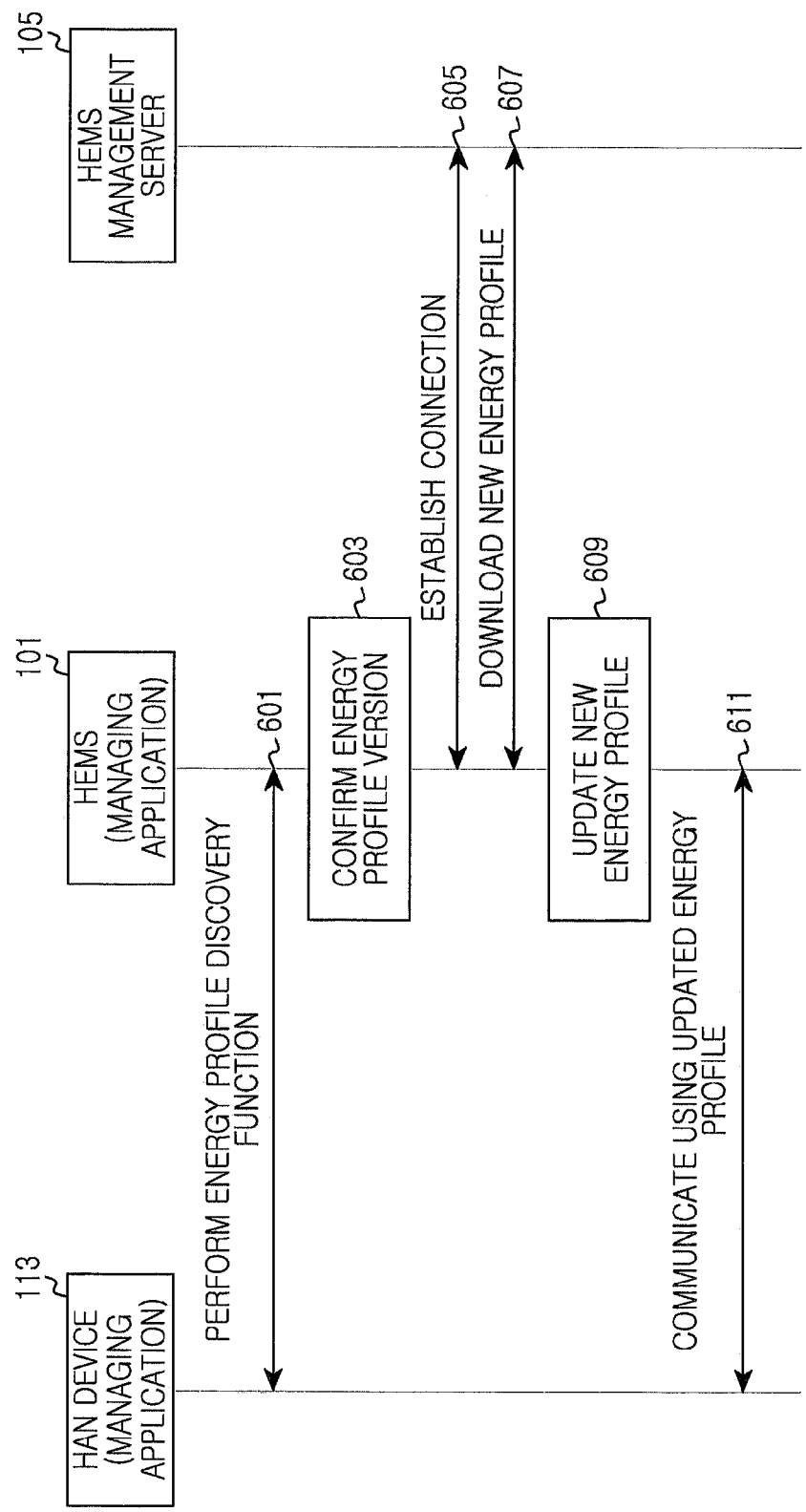
FIG. 6 illustrates a process of updating an energy profile of an HEMS 101 when the HEMS 101 communicates with an HAN device 113 in an HAN according to an exemplary embodiment of the present invention.

FIG. 6 illustrates a process of updating an energy profile of an HEMS 101 when the HEMS 101 communicates with an HAN device 113 in an HAN according to an exemplary embodiment of the present invention. It is assumed that the HEMS 101 and the HAN device 113 perform the process of FIG. 3, and the aforementioned managing application program for smart energy is driven.

Referring to FIG. 6, the HEMS 101 and the HAN device 113 perform an energy profile discovery function in block 601. In block 603, the HEMS 101 acquires energy profile information and thereafter confirms whether it is an energy profile that may be supported by the HEMS 101. If the energy profile is not supported, proceeding to block 605, the HEMS 101 establishes a connection with an energy profile download server. It is assumed in this embodiment that the energy profile download server is an HEMS management server 105. In block 607, the HEMS 101 downloads the energy profile from the download server by using an FTP. If the energy profile is supported, blocks 605 and 607 are omitted.

In block 609, the HEMS 101 downloads a new energy profile from the HEMS management server 105 and installs the new energy profile. In block 611, the HEMS 101 and the HAN device 113 communicate with each other by using the new energy profile.

Figure 7:
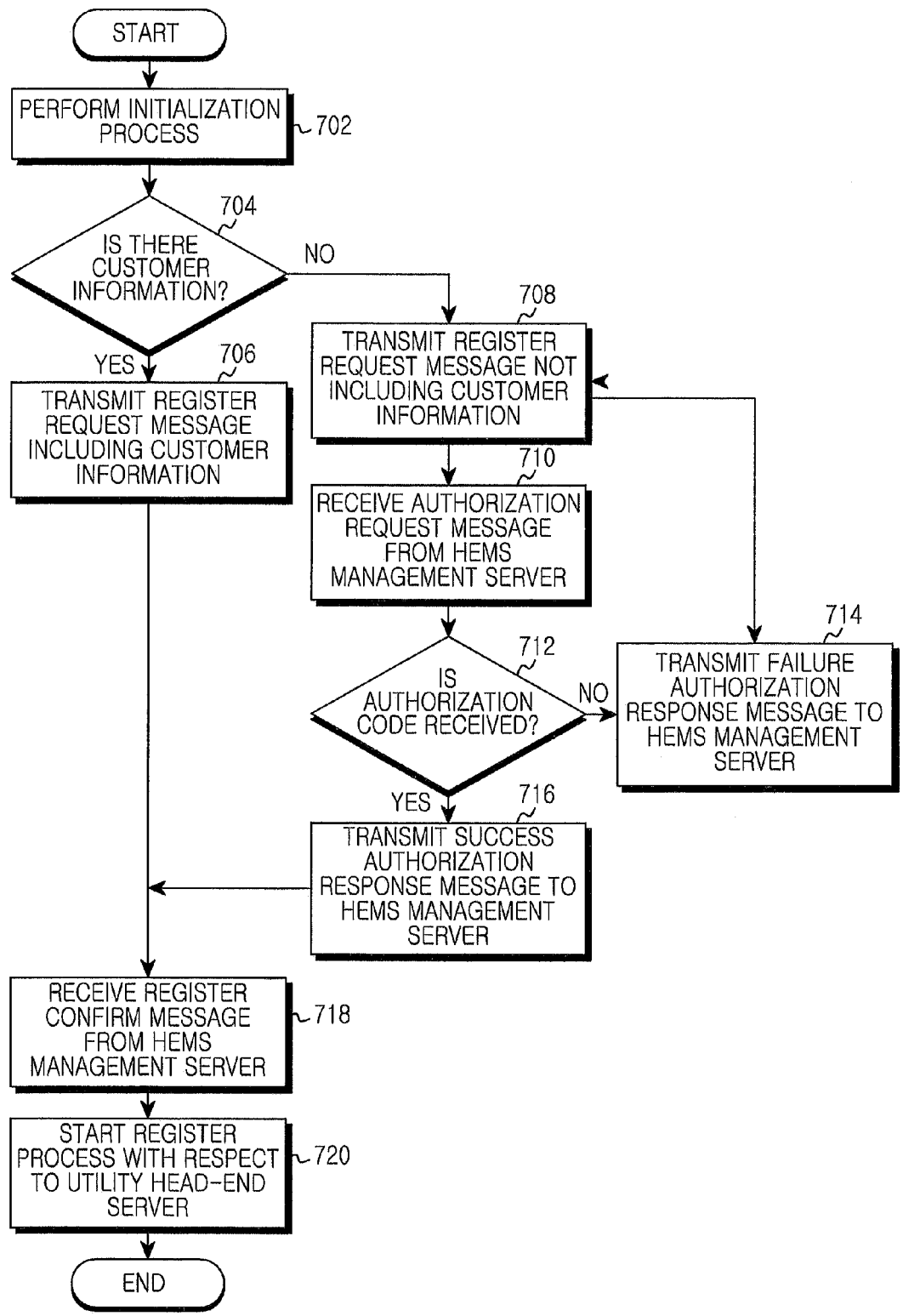
FIG. 7 illustrates an operation of an HEMS when the HEMS intends to register to a smart meter in an HAN according to an exemplary embodiment of the present invention.

FIG. 7 illustrates an operation of a HEMS when the HEMS intends to register to a smart meter in an HAN according to an exemplary embodiment of the present invention.

Referring to FIG. 7, the HEMS starts an initialization process in block 702. If there is customer information in block 704, the HEMS transmits a register request message including the customer information to an HEMS management server in block 706.

Otherwise, if there is no customer information, proceeding to block 708, the HEMS transmits a register request message not including the customer information to the HEMS management server.

In block 710, the HEMS receives an authorization request message from the HEMS management server.

Upon receiving an authorization code in block 712, that is, upon receiving an SMS message having the authorization code from a UE, proceeding to block 716, the HEMS transmits an authorization response (w/t the authorization code) message to the HEMS management server.

If the SMS message is not successfully received from the UE, proceeding to block 714, the HEMS transmits an authorization response (status failure) message to the HEMS management server. Then, block 708 is performed again. In block 718, the HEMS receives a register confirm message from the HEMS management server. In block 720, the HEMS starts a registration process with respect to a utility head-end server.

Figure 8:
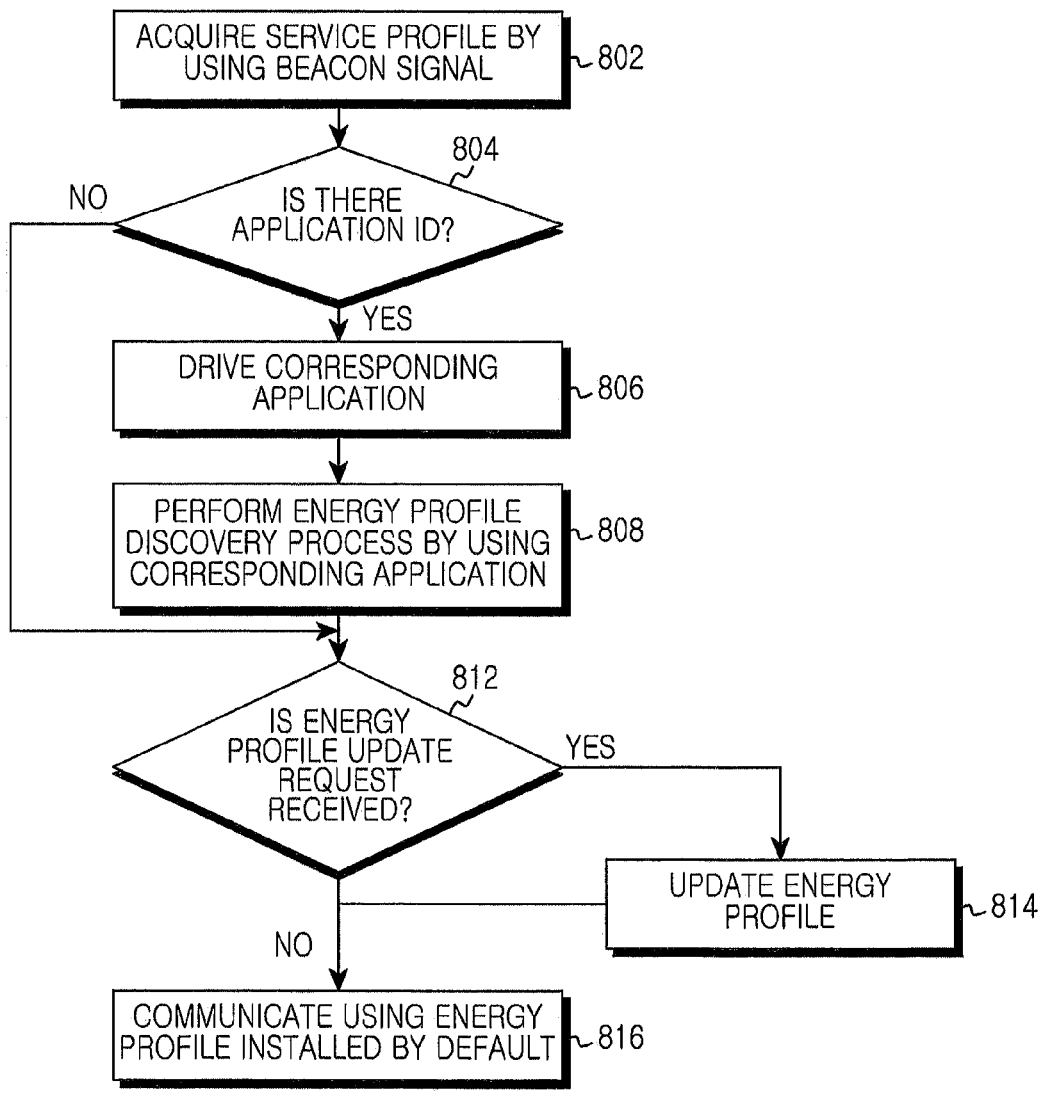
FIG. 8 illustrates an operation of an HAN device in an HAN according to an exemplary embodiment of the present invention.

FIG. 8 illustrates an operation of an HAN device in an HAN according to an exemplary embodiment of the present invention.

Referring to FIG. 8, the HAN device receives a beacon message and then acquires service profile information in block 802. If an application ID exists in the service profile information, the HAN device establishes a link in block 804, and drives a corresponding application in block 806. If there is no application ID in the service profile information, proceeding to block 816, the HAN device communicates with the HEMS by using an energy profile installed by default in the HAN device.

In block 808, the HAN device performs an energy profile discovery process with respect to the HEMS by using the driven application. Upon receiving an energy profile update request from the HEMS in block 812, the energy profile is updated in block 814. If there is no energy profile update request in block 812, proceeding to block 816, the HAN device communicates with the HEMS by using the energy profile installed by default.

Figure 9:
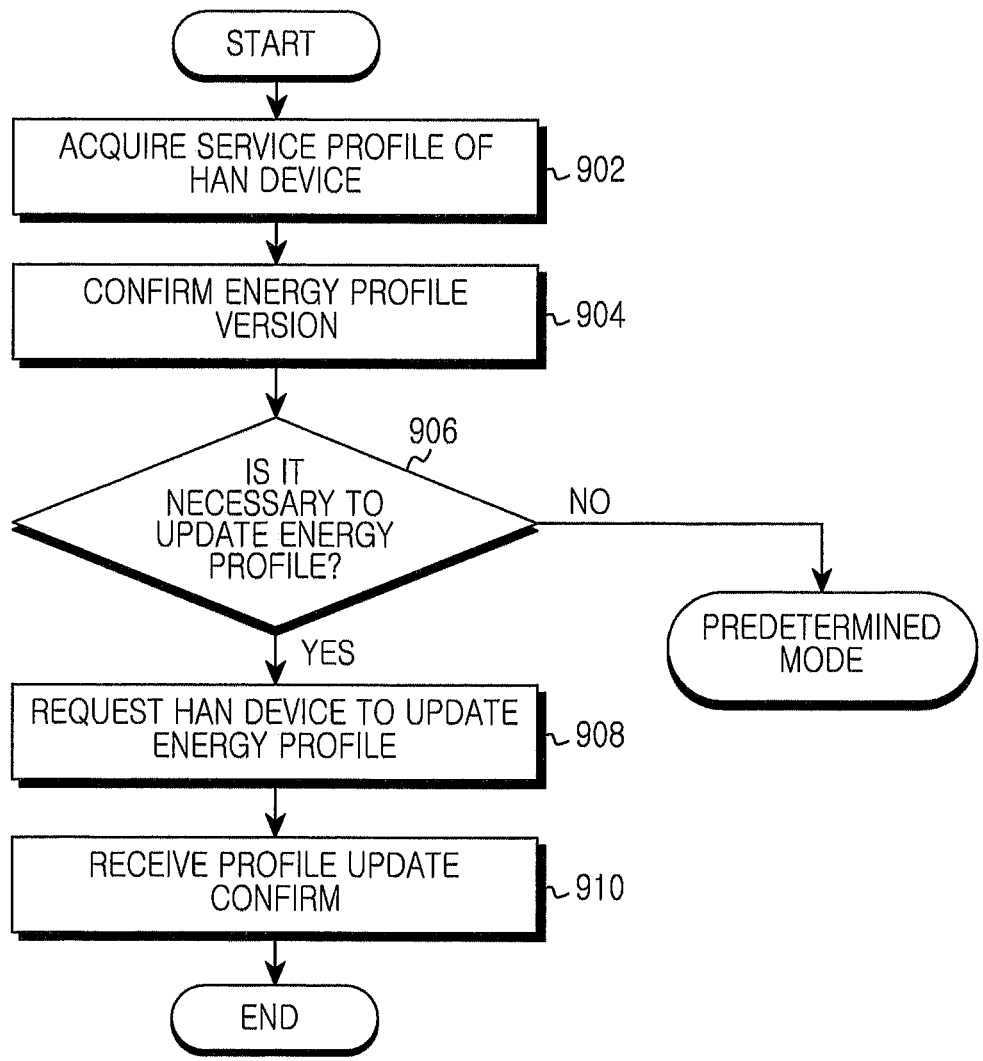
FIG. 9 illustrates an operation of an HEMS in an HAN according to an exemplary embodiment of the present invention.

FIG. 9 illustrates an operation of a HEMS in an HAN according to an exemplary embodiment of the present invention.

Referring to FIG. 9, the HEMS performs an energy profile discovery function in block 902. The HEMS confirms an energy profile version of a corresponding HAN device in block 904, and determines whether the energy profile of the HAN device needs to be updated in block 906.

If there is no need to update the energy profile of the HAN device, the procedure proceeds to a predetermined mode.

Otherwise, if the energy profile of the HAN device needs to be updated, proceeding to block 908, an energy profile update request is sent to the HAN device.

In block 910, the HEMS receives a profile update confirm message from the HAN device.

Figure 10:
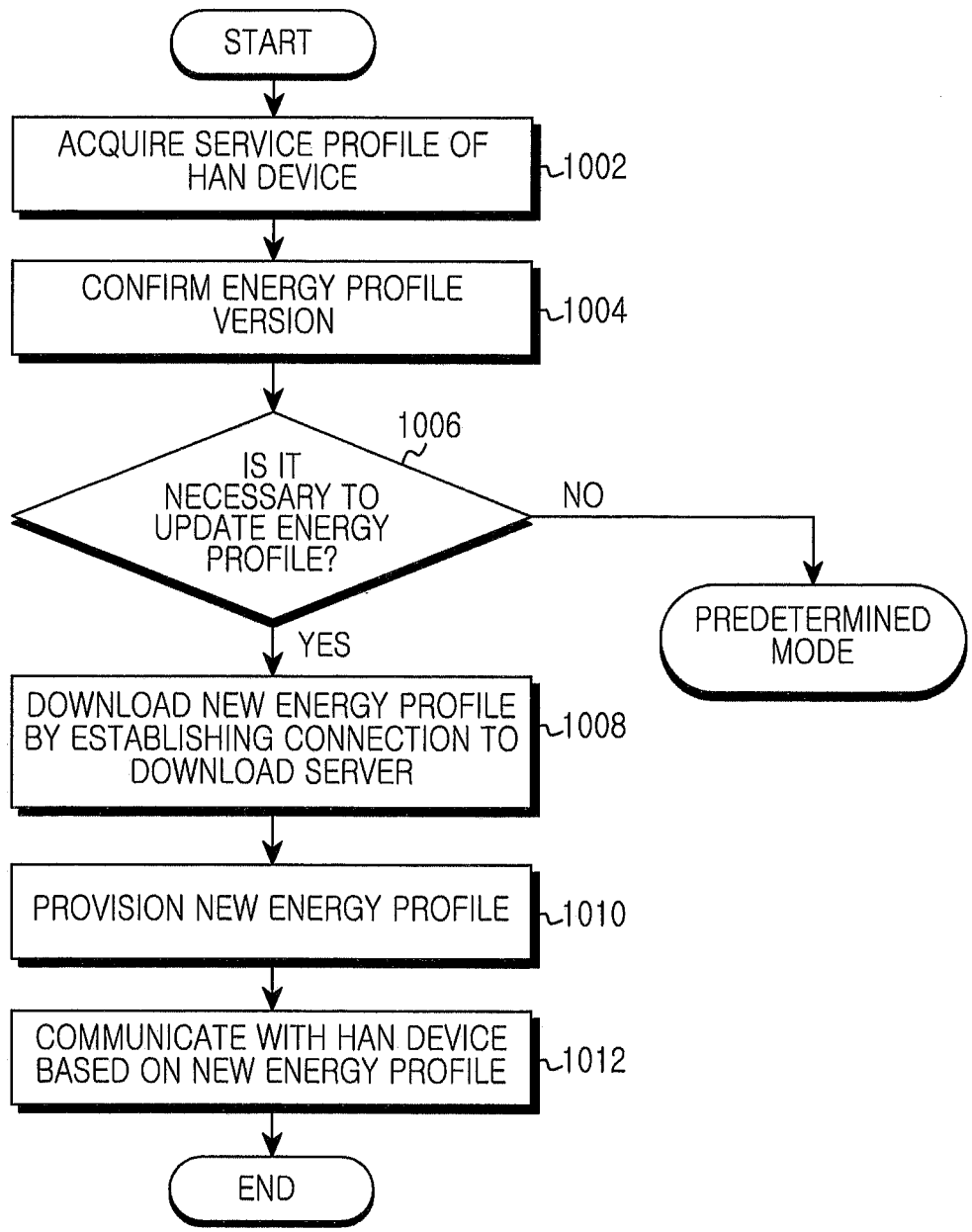
FIG. 10 illustrates an operation of an HEMS in an HAN according to another exemplary embodiment of the present invention.

FIG. 10 illustrates an operation of a HEMS in an HAN according to another exemplary embodiment of the present invention.

Referring to FIG. 10, the HEMS performs an energy profile discovery function in block 1002. The HEMS confirms an energy profile version of a corresponding HAN device in block 1004, and determines whether the energy profile of the HAN device needs to be updated.

If there is no need to update the energy profile of the HAN device, the procedure proceeds to a predetermined mode.

Otherwise, if the energy profile of the HAN device needs to be updated, proceeding to block 1008, a connection to a download server is established to download a new energy profile.

The HEMS provisions the downloaded new energy profile in block 1010, and performs communication with the HAN device on the basis of the new energy profile in block 1012.

According to exemplary embodiments of the present invention, by automatically upgrading software or firmware related to an energy profile in a Home Area Network (HAN), a Demand Response (DR) may normally operate between devices even if the energy profile differs from one device to another. In addition, when the devices support different energy profiles, the energy profiles are updated automatically without an additional manual operation, thereby being able to be conveniently used by a user.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method to configure a home energy management system (HEMS) in a home area network (HAN), the method comprising:

performing customer authorization in a server of a power provider based on HEMS device information and customer authorization information inputted through the HEMS;

registering the HEMS device information and customer authorization information with a smart meter; and managing each of one or more energy profiles of at least one HAN device including the smart meter connected to the HAN, wherein managing each of the one or more energy profiles of the at least one HAN device comprises:

requesting, by the at least one HAN device, a beacon message to the smart meter, and transmitting, by the smart meter, the beacon message including energy profile information to the at least one HAN device.

2. The method of claim 1, wherein the at least one HAN device is one of the HEMS, a smart home appliance, and an In-Home Display (IHD).

3. The method of claim 1, wherein the energy profile information includes at least one of a manufacturer, a utility provider, an energy profile version, a type, and an application identifier.

4. The method of claim 1, further comprising:
determining, by the HEMS, an energy profile version on the basis of the received energy profile.

5. The method of claim 4, wherein determining the energy profile version on the basis of the received energy profile comprises executing a corresponding application to exchange the energy profile when an application identifier is included in the received energy profile.

6. The method of claim 1, wherein managing each of the one or more energy profiles of the at least one HAN device including the smart meter connected to the HAN comprises;

performing radio access between a User Equipment user equipment (UE) and the HEMS;

receiving location information by transmitting a location request message by the HEMS to the UE;

requesting, by the HEMS, a profile by transmitting the location information of the UE to a server that manages the HEMS; and receiving, by the HEMS, energy profile information of the smart meter from an HEMS server.

7. The method of claim 6, wherein the location information of the UE is either a zip code of an area to which the UE is registered or global positioning system (GPS) location information.

8. The method of claim 1, wherein managing each of the one or more energy profiles of the at least one HAN device including the smart meter connected to the HAN comprises:

receiving, by a HEMS management server, location information of a UE from the HEMS;

determining, by the HEMS management server, power provider information of a corresponding area and the smart meter's energy profile information provided by a power provider on the basis of the location information of the UE; and transmitting, by the HEMS management server, to the at least one HAN device, a profile message including the power provider information of the corresponding area and the smart meter's energy profile information provided by the power provider.

9. The method of claim 1, wherein managing each of the one or more energy profiles of the at least one HAN device including the smart meter connected to the HAN comprises:

exchanging an energy profile between the at least one HAN device and the HEMS;

upon receiving a profile update request message including an address of a download server from the HEMS, downloading by the at least one HAN device, a new energy profile by using a file transfer protocol by establishing a connection to the download server; and installing, by the at least one HAN, device the downloaded new energy profile.

10. The method of claim 9, wherein the download server is a HEMS management server.

11. The method of claim 10, wherein the at least one HAN device is one of a smart home appliance and an IHD.

12. The method of claim 1, wherein managing each of the one or more energy profiles of the at least one HAN device including the smart meter connected to the HAN comprises:

exchanging an energy profile between the HEMS and the at least one HAN device;

determining, by the HEMS, whether an energy profile of the at least one HAN device is supported by determining an energy profile version of the at least one HAN device; and if the energy profile of the at least one HAN device is not supported, transmitting by the HEMS a profile update request message including an address of a download server to the at least one HAN device.

13. The method of claim 12, wherein the download server is a HEMS management server.

14. The method of claim 12, wherein the at least one HAN device is one of a smart home appliance and an IHD.

15. The method of claim 1, wherein managing each of the one or more energy profiles of the at least one HAN device including the smart meter connected to the HAN comprises:

exchanging a service profile between the HEMS and the at least one HAN device;

determining, by the HEMS, whether a service profile of the at least one HAN device is supported by determining an energy profile version of the at least one HAN device; and if the energy profile of the at least one HAN device is not supported, downloading, by the at least one HAN device, a new energy profile using a file transfer protocol by establishing a connection to the download server; and installing the downloaded new energy profile.

16. The method of claim 15, wherein the download server is a HEMS management server.

17. The method of claim 15, wherein the at least one HAN device is one of a smart home appliance and an in-home display (IHD).

18. The method of claim 1, wherein performing the customer authorization in the server of the power provider based on the HEMS device information and the customer authorization information inputted through the HEMS comprises:

transmitting, by the HEMS, a first register request message to an HEMS management server;

transmitting, by the HEMS management server, a second register request message including the customer authorization information to a head-end server that manages the smart meter in a utility provider network after determining the customer authorization information of the HEMS; and provisioning, by the head-end server, the HEMS device information and authorization key information to the smarter meter after performing customer authorization on the basis of the customer authorization information.

19. The method of claim 18, further comprising:
determining whether the first register request message includes the customer authorization information;

if the first register request message does not include the customer authorization information, transmitting by the HEMS server an authorization request message to the HEMS and transmitting a short message service (SMS) message including an authorization code to a UE of a pre-registered customer; and receiving, by the HEMS, the SMS message including the authorization code from the UE of the pre-registered customer and transmitting the received authorization code to the HEMS management server.

20. The method of claim 1, further comprising updating the energy profile of the at least one HAN device.

21. The method of claim 20, wherein updating the energy profile of the at least one HAN device comprises:
acquiring energy profile information by receiving a beacon energy from the HEMS;
if an application identifier exists in the energy profile information, driving a corresponding application after establishing a link;
performing an energy profile discovery process with respect to the HEMS using the driven application; and
upon receiving an energy profile update request from the HEMS, downloading and updating a new energy profile.

22. The method of claim 21, further comprising, if the application identifier does not exist in the energy profile information, communicating with the HEMS on the basis of a default energy profile.

23. The method of claim 21, further comprising, if there is no energy profile update request from the HEMS, communicating with the HEMS on the basis of a default energy profile.

24. A system operable to register to a smart meter in a home area network (HAN), the system comprising:
a home energy management system (HEMS) configured to:
transmit a first register request message including HEMS information and customer authorization information inputted through the HEMS to an HEMS management server;
the HEMS management server configured to:
perform subscriber authorization based on the first register request message, and
transmit a second register request message including the customer authorization information to a head-end server that manages the smart meter in a utility provider network; and
the head-end server is configured to:
generate an authorization key after performing the customer authorization using the second register request message, and
provide both the HEMS information and the authorization key with the smarter meter.

25. The system of claim 24, wherein the HEMS management server is configured to determine whether the first register request message includes the customer authorization information,
wherein if the first register request message does not include the customer authorization information, the HEMS management server is configured to transmit an authorization request message to the HEMS and transmit a Short Message Service (SMS) message including an authorization code to a user equipment (UE) of a pre-registered customer, and
wherein the HEMS is configured to receive the SMS message including the authorization code from the UE of the pre-registered customer and transmit the received authorization code to the HEMS management server.

26. The system of claim 25, wherein a mutual access process is performed between the HEMS management server and the UE of the pre-registered customer.

27. A management server operable to provide an energy profile between devices in a home area network (HAN), comprising:
a controller configured to:
receive location information of a HAN device from a home energy management system (HEMS), and
transmit, to the HEMS, an, energy profile provided within an area corresponding to the location information, wherein the location information is either zip code of an area to which the HAN device is registered or global positioning system (GPS) location information.

28. A home area network (HAN) device operable to manage an energy profile between devices in a HAN, the HAN device comprising:
a controller configured to:
receive service profile information comprising an application identifier from a smart meter;
execute an application corresponding to the application identifier;
obtain the energy profile using the executed application;
transmit an energy profile version to a home energy management system (HEMS); and
receive a profile update request message from the HEMS.

29. The HAN device of claim 28, wherein the controller is configured to update the energy profile.

30. The HAN device of claim 29, wherein the controller is configured to determine whether the profile update request message is received, and if the profile update request message is not received, install a default energy profile stored in the HAN device.

31. The HAN device of claim 28, wherein the controller is configured to download a new energy profile based on an address of a download server included in the received profile update request message.

32. The HAN device of claim 28, wherein the controller is configured to transmit location information of the HAN device to the HEMS using the executed application,
wherein the location information is used to obtain the energy profile provided within a corresponding area in the HEMS.

33. The HAN device of claim 28, wherein the controller is configured to transmit a beacon request message to the smart meter, and receive the service profile information comprising the application identifier in response to the beacon request message.

34. A home energy management system (HEMS) operable to manage an energy profile between devices in a home area network (HAN), comprising:
a controller configured to:
receive location information from HAN device; and
obtain an energy profile provided within an area corresponding to the location information, wherein the location information is either a zip code of an area to which the HAN device is registered or global positioning system (GPS) location information.

35. The HEMS of claim 34, wherein the controller is configured to transmit an energy profile request message comprising the location information to a managing server and receive the energy profile provided within the area corresponding to the location information from the managing server.

36. The HEMS of claim 34, wherein the controller is configured to:

receive an energy profile version from the HAN device, determine whether an energy service profile of the HAN device is supported based on the received energy profile version, if the energy profile of the HAN device is not supported, download a new energy profile from a download server.

37. The HEMS of claim 34, wherein the controller is configured to receive an energy profile version from the HAN device, determine whether an energy profile of the HAN device is supported based on the received energy profile version, and if the energy profile of the HAN device is not supported, transmit a profile update request message.

38. The HEMS of claim 37, wherein the profile update request message comprises an address of a download server.

39. A method to manage an energy profile in home area network (HAN) device, the method comprising:

receiving service profile information comprising an application identifier from a smart meter;

executing an application corresponding to the application identifier;

obtaining the energy profile using the executed application;

transmitting an energy profile version to a home energy management system (HEMS); and receiving a profile update request message from the HEMS.

40. The method of claim 39, further comprising:
updating the energy profile.

41. The method of claim 40, wherein updating the energy profile comprises downloading a new energy profile based on an address of a download server included in the received profile update request message.

42. The method of claim 40, further comprising:

determining whether the profile update request message is received; and if the profile update request message is not received, installing a default energy profile stored in the HAN device.

43. The method of claim 39, further comprising:

transmitting location information of the HAN device to the HEMS using the executed application, wherein the location information is used to obtain the energy profile provided within a corresponding area in the HEMS.

44. The method of claim 39, wherein receiving the service profile information comprising an application identifier from the smart meter comprises:

transmitting a beacon request message to smart meter; and receiving the service profile information comprising the application identifier in response to the beacon request message.

45. A method to manage an energy profile in a home energy management system (HEMS), the method comprising:

receiving location information from a home area network (HAN) device; and obtaining an energy profile provided within an area corresponding to the location information, wherein the location information is either a zip code of an area to which the HAN device is registered or Global Positioning System (GPS) location information.

46. The method of claim 45, wherein obtaining the energy profile provided within the area corresponding to the location information comprises:

transmitting an energy profile request message including the location information to a management server; and receiving the energy profile provided within the area corresponding to the location information from the management server.

47. The method of claim 46, wherein the profile update request message comprises an address of a download server.

48. The method of claim 45, further comprising:

receiving an energy profile version from the HAN device;

determining whether an energy profile of the HAN device is supported, based on the received energy profile version; and if the energy profile of the HAN device is not supported, transmitting a profile update request message.

49. The method of claim 45, further comprising:

receiving an energy profile version from the HAN device;

determining whether an energy profile of the HAN device is supported, based on the received energy profile version; and if the energy profile of the HAN device is not supported, downloading a new energy profile from a download server.

50. A method to manage an energy profile in a management server, the method comprising:

receiving location information of a home area network (HAN) device from the home energy management system (HEMS); and transmitting, to the HEMS, an energy profile provided within an area corresponding to the location information, wherein the location information is either a zip code of an area to which the HAN device is registered or Global Positioning System (GPS) location information.

51. A smart meter operable to manage an energy profile in a home area network (HAN), the smart meter comprising:

a controller configured to:

receive a beacon request message from a HAN device; and transmit, to the HAN device, service profile information comprising an application identifier in response to the beacon request message, wherein the application identifier is used to exchange an energy profile in the HAN device by executing a managing application corresponding to the application ID.

52. A method to manage an energy profile in a smart meter, the method comprising:

receiving a beacon request message from a home area network (HAN) device; and transmitting, to the HAN device, service profile information comprising an application identifier in response to the beacon request message, wherein the application identifier is used to exchange an energy profile in the HAN device by executing a managing application corresponding to the application ID.

* * * * *